(12) United States Patent
Yu

(10) Patent No.: US 10,885,588 B2
(45) Date of Patent: Jan. 5, 2021

(54) MACHINE-VISION-BASED ELECTRONIC AUTOMOBILE INSURANCE FEE METER

(71) Applicant: Nanjing Xega Electronics Technology Co., Ltd., Nanjing (CN)

(72) Inventor: Jiamin Yu, Shanghai (CN)

(73) Assignee: Nanjing Xega Electronics Technology Co., Ltd., Nanjing (CN)

( * ) Notice: Subject to any disclaimer, the term of this patent is extended or adjusted under 35 U.S.C. 154(b) by 335 days.

(21) Appl. No.: 15/757,288

(22) PCT Filed: Sep. 2, 2015

(86) PCT No.: PCT/CN2015/088870
§ 371 (c)(1),
(2) Date: Jun. 13, 2018

(87) PCT Pub. No.: WO2017/035811
PCT Pub. Date: Mar. 9, 2017

(65) Prior Publication Data
US 2018/0276760 A1    Sep. 27, 2018

(51) Int. Cl.
*G06Q 40/00*     (2012.01)
*G06Q 40/08*     (2012.01)
(Continued)

(52) U.S. Cl.
CPC ............. *G06Q 40/08* (2013.01); *B60W 40/09* (2013.01); *G06K 9/00798* (2013.01);
(Continued)

(58) Field of Classification Search
CPC ........ G06Q 40/08; G06Q 10/10; G06Q 50/30; G06Q 30/0261; G06Q 30/0269;
(Continued)

(56) References Cited

U.S. PATENT DOCUMENTS

| 6,448,889 B1 * | 9/2002 | Hudson | B60R 13/10 |
| | | | 340/425.5 |
| 10,332,208 B1 * | 6/2019 | Loo | G06Q 40/08 |

(Continued)

FOREIGN PATENT DOCUMENTS

| CN | 1378136 A | 11/2002 |
| CN | 101700759 A | 5/2010 |

(Continued)

OTHER PUBLICATIONS

PCT; App. No. PCT/CN2015/088870; International Search Report and Written Opinion dated May 25, 2016.

*Primary Examiner* — Jingge Wu
(74) *Attorney, Agent, or Firm* — Fitch, Even, Tabin & Flannery LLP

(57) ABSTRACT

The present invention provides a machine-vision-based electronic automobile insurance fee meter. The machine-vision-based electronic automobile insurance fee meter can capture a lane departure behavior, and record a distance and duration of a lane departure in a memory module; also can capture a following-too-close behavior, and record a distance and duration of dangerous following in the memory module; and also can calculate a journey-based mileage insurance fee, a total mileage insurance fee P being a product of a mileage L of a journey, a unit mileage (per kilometer) insurance rate $R_{km}$ and a safety floating factor f. The present technical solution charges the insurance fee according to the actual driving mileage, makes the charging of the insurance fee fairer and more reasonable, and encourages safe driving and driving less; and also can identify the most important dangerous driving risks including following-too-close and lane departure, making the pricing of the insurance fee more accurate and reasonable.

9 Claims, 2 Drawing Sheets

(51) Int. Cl.
*G07B 13/00* (2006.01)
*B60W 40/09* (2012.01)
*G06K 9/00* (2006.01)
*G07C 5/02* (2006.01)
G07C 5/08 (2006.01)
G07C 5/00 (2006.01)

(52) U.S. Cl.
CPC ............... *G07B 13/00* (2013.01); *G07C 5/02* (2013.01); *G07C 5/008* (2013.01); *G07C 5/0866* (2013.01)

(58) Field of Classification Search
CPC .......... G06Q 40/00; G07C 5/008; G07C 5/02; G07C 5/0866; G07C 5/0891; B60W 40/09; B60W 2540/043; G06K 2209/01; G06K 9/00798; G06K 9/00805; G06K 9/32; G07B 15/02; G07B 13/00; H04N 21/4223; H04N 5/23296; H04N 1/00244; H04N 1/00307
See application file for complete search history.

(56) References Cited

U.S. PATENT DOCUMENTS

| | | | | |
|---|---|---|---|---|
| 10,380,694 B1* | 8/2019 | Grant | ................ | G06Q 50/265 |
| 10,559,037 B1* | 2/2020 | Mendenhall | ........... | G06Q 40/08 |
| 2002/0026426 A1* | 2/2002 | Bennett | ................. | G06Q 20/18 |
| | | | | 705/64 |
| 2002/0115423 A1* | 8/2002 | Hatae | ............... | G08B 13/19645 |
| | | | | 455/404.1 |
| 2002/0128882 A1* | 9/2002 | Nakagawa | ............. | G06Q 30/02 |
| | | | | 705/4 |
| 2002/0178033 A1 | 11/2002 | Yoshioka et al. | | |
| 2003/0233261 A1* | 12/2003 | Kawahara | .............. | G06Q 10/10 |
| | | | | 705/4 |
| 2005/0171663 A1* | 8/2005 | Mittelsteadt | ........... | G06Q 40/08 |
| | | | | 701/32.6 |
| 2009/0106052 A1* | 4/2009 | Moldovan | .............. | G06Q 10/10 |
| | | | | 705/4 |
| 2010/0174564 A1* | 7/2010 | Stender | ................... | G06Q 10/10 |
| | | | | 705/4 |
| 2011/0015494 A1 | 1/2011 | Spaulding | | |
| 2012/0323772 A1* | 12/2012 | Michael | ................. | G06Q 40/00 |
| | | | | 705/39 |
| 2013/0150004 A1* | 6/2013 | Rosen | ..................... | H04W 8/22 |
| | | | | 455/414.1 |
| 2014/0257862 A1* | 9/2014 | Billman | ................. | G06Q 40/08 |
| | | | | 705/4 |
| 2014/0257873 A1* | 9/2014 | Hayward | ............... | G07C 5/008 |
| | | | | 705/4 |
| 2014/0358321 A1 | 12/2014 | Ibrahim | | |
| 2015/0026174 A1* | 1/2015 | Nuggehalli | ............ | G06Q 10/00 |
| | | | | 707/736 |
| 2015/0054639 A1* | 2/2015 | Rosen | ................ | G06K 9/00785 |
| | | | | 340/439 |
| 2015/0120334 A1* | 4/2015 | Jones | .................... | G06Q 40/08 |
| | | | | 705/4 |
| 2016/0050364 A1* | 2/2016 | Lowell | ............... | H04N 5/23222 |
| | | | | 348/333.01 |
| 2016/0156881 A1* | 6/2016 | Guan | .................... | H04N 7/185 |
| | | | | 348/148 |
| 2017/0161840 A1* | 6/2017 | Omata | ................... | G01N 19/02 |
| 2017/0200197 A1* | 7/2017 | Brubaker | ............ | B60Q 1/2696 |

FOREIGN PATENT DOCUMENTS

| | | |
|---|---|---|
| CN | 202956799 U | 5/2013 |
| CN | 103150675 A | 6/2013 |
| CN | 203332108 U | 12/2013 |
| CN | 103854309 A | 6/2014 |
| CN | 104029680 A | 9/2014 |
| CN | 204303041 U | 4/2015 |
| CN | 105184872 A | 12/2015 |

* cited by examiner

MACHINE-VISION-BASED ELECTRONIC AUTOMOBILE INSURANCE FEE METER

FIELD OF THE INVENTION

The present invention relates to an electronic automobile insurance fee meter, and particularly relates to a machine-vision-based electronic insurance fee meter.

DESCRIPTION OF THE PRIOR ART

The automobile insurance fee is charged in a yearly charging mode currently. Risks of the automobile insurance is obviously directly related to a use state of a car, more driving on the car may necessarily increase the accident risk, less driving on the car may decrease the accident risk, and when the car is not driven, the accident risk is nearly zero. Therefore, conventional automobile insurance is unfair in purely adopting yearly charging, and the automobile insurance fee should be accurately charged according to the usage like water, electricity and gas, which is fairer and more reasonable.

The utility model patent (Authorization Publication No.: CN202956799U), entitled 'ELECTRONIC AUTOMOBILE INSURANCE FEE METER', invents an electronic meter for calculating a total accumulative insurance fee according to an actual journey mileage. According to the solution, data of a Global Positioning System (GPS), an automobile computer and a car body radar is acquired, and thus, the total journey-based accumulative mileage insurance fee is calculated.

In the field of automobile safety, the application of an Advanced Driver Assistance System (ADAS) is increasingly mature. Particularly, a machine vision method utilizing an image sensor technology is widely applied to a Lane Departure Warning System (LDWS) and a Car Distance Preserving Technology (CDPT). Currently, the LDWS has been equipped in car models of Volkswagen CC, BMW 5-Series, Mercedes-Benz E-Class, Infiniti M-Series and the like; and the CDPT has been configured to car models of Nissan QX56, M37 and Volvo XC60, XC90 and the like.

In China, the automobile traffic accident statistics shows that a too close following distance and illegal lane changing are the two uppermost accident reasons, and account for about 45% and 22% of all accidents. For the most common rear-end accidents in the automobile accidents, 80% of rear-end accidents are caused by the too close following distance. According to the technical solution of the above-mentioned utility model patent entitled 'ELECTRONIC AUTOMOBILE INSURANCE FEE METER', a car lane departure behavior completely cannot be identified; and the car body radar has a relatively low accuracy in identifying a distance to a front vehicle in cases of nonlinear lanes and intermediate-long distances. The prior art has defects in identifying features of the most important dangerous driving behaviors (following-too-close and lane departure). Therefore, those skilled in the art are devoted to developing a machine-vision-based electronic automobile insurance fee meter and a charging method thereof so as to change conventional insurance fee charging modes of automobile insurance and implement accurate charging and post payment based on driving habits of drivers.

SUMMARY OF THE INVENTION

In view of the above-mentioned defects in the prior art, the present invention aims to solve the technical problems that in an existing automobile insurance charging mode, driving habits such as following-too-close and lane departure of a driver of an insured car cannot be accurately measured, so that dangerous factors and a risk price of each automobile insurance cannot be accurately determined, and this is obviously unfair to charge a high insurance fee for the insureds with good driving habits.

In order to fulfill the above-mentioned aim, the present invention provides a machine-vision-based electronic automobile insurance fee meter, including a central processing unit, a memory module, a sensor module, a user interface module and a network communication module; the sensor module includes: a camera module, an accelerometer/angular velocity meter unit and a GPS module, wherein the camera module consists of a camera unit and an image processing chip; and the meter is configured to acquire image information of the front of an insured car by the camera unit, the image processing chip performs data processing and feature identification on the image information, the central processing unit makes a determination on identified features, and stores times information and time information which accord with lane departure and following-too-close in the memory module.

Further, the accelerometer/angular velocity meter unit acquires an acceleration and an angular velocity of the insured car; and the GPS module acquires data of GPS or Beidou system real-time trajectory of the insured car.

Further, the user interface module includes: a display module and a key unit; the user interface module is configured such that a user can select and query a kilometer insurance fee unit price, a charged mileage, an insurance fee of the charged mileage, an insurance fee floating factor and lane departure and following-too-close records by operating the key unit; and query results are displayed on the display module.

Further, the network communication module is configured to support 4G/3G/2G network systems, and is used for carrying out information interaction with a car insurance business database of an insurance company and generating an insurance fee transaction record.

Further, the meter is configured such that gray scale filtering processing is performed on the image information by the image processing chip; and the central processing unit detects out a quadrilateral contour TT' B' B of a rear portion of a car in the front according to bilateral symmetrical and horizontal-vertical boundary features of the car in the front, and obtains coordinates of four vertexes of the contour in an image, then calculates a contour feature ratio, an upper-lower bottom ratio $R_b$ and a height-width ratio $R_l$, $$R_b = \frac{TT'}{BB'}, R_l = \frac{TB}{BB'},$$

and a car feature table is queried according to values of $R_b$ and $R_l$ so as to obtain a type and a width $b_F$ of the car in the front; and finally, according to a focus length and an image resolution of the camera module, an actual distance Z from the car in the front is calculated, $$Z = \frac{b_F \times f}{BB'/HR},$$

wherein $b_F$ represents a car width of the car in the front, f represents a lens focus length of a camera, BB' represents a pixel width in the image of the car in the front, and HR represents a horizontal resolution of the camera unit; and if a current actual car velocity is Vt, and according to set minimum safe following reaction time $T_s$, when $Z<V_t \times T_s$, a dangerous following behavior is determined.

Further, the meter is further configured such that the central processing unit calculates following-too-close duration $T_{KD}$, $$T_{KD} = \int SK_t * dt$$

wherein $SK_t$ represents a following safety state:

$$SK_t = \begin{cases} 1 \text{(too close)} & \text{when } Z < V_t \times T_s \\ 0 \text{(safe)} & \text{when } Z \geq V_t * T_s \end{cases},$$

and when the following-too-close duration $T_{KD}$ is greater than a preset value, the dangerous following behavior is determined.

Further, the meter is configured such that gray scale filtering processing is performed on the image information by the image processing chip; and the central processing unit identifies a laneway line sign in a current road and coordinates of the laneway line sign in the image according to edge features of an oblique straight line of the laneway line sign, calculates coordinates of a lane centerline OO', and meanwhile, also calculates a coordinate distance LR of left and right laneway lines and a lane width w, compares coordinate differences between the lane centerline OO' in the image and a central axis MVP of front and rear wheels of the car, i.e., OM and O'M', and calculates to obtain corresponding far-end and near-end central axis departures d2 and d1 through an optical perspective geometric imaging formula, $$d2 = \frac{O'M'/HR}{f} \times Z2$$

wherein O'M' represents a far-end image coordinate pixel distance value, Z2 represents a distance from a far-end line to the camera, HR represents an image resolution of the camera, and f represents a focal length of the camera;

$$d1 = \frac{OM/HR}{f} \times Z1,$$

wherein OM represents a near-end image coordinate pixel distance, Z1 represents a distance from a near-end line to the camera, HR represents the image resolution of the camera, and f represents the focal length of the camera; then according to the distances Z2 and Z1 from the far-end and near-end lines to the camera, on the basis of a geometric proportion relationship, a transverse position d of an axle center C of the front wheels of the car in a lane is calculated;

$$d = (d1 - d2) \times \frac{Z1}{Z2 - Z1} + d1$$

and finally, according to the lane width w and a car width b, an actual distance of departure dp of the car from the lane line is calculated, $$dp = \begin{cases} d + \frac{b}{2} - \frac{w}{2}, & \text{when } d > \frac{w-b}{2} \\ d - \frac{b}{2} + \frac{w}{2} & \text{when } d < \frac{b-w}{2} \\ 0, & \text{when } \frac{b-w}{2} \leq d \leq \frac{w-b}{2} \end{cases},$$

wherein the lane width w is $$w = \frac{LR}{OM},$$

and when the lane departure distance dp is greater than a preset value, a lane departure behavior is determined.

Further, the meter is further configured such that the central processing unit calculates lane departure duration $T_{DD}$, $$T_{DD} = \int |SD_t * dt|$$

wherein a land hold state $SD_t$ is $$SD_t = \begin{cases} 1 \text{(right departure)} & \text{when } dp > 0 \\ 0 \text{(safe)} & \text{when } dp = 0 \\ -1 \text{(left departure)} & \text{when } dp < 0 \end{cases}$$

and when the land hold state $SD_t$ is greater than a preset value, the lane departure behavior is determined.

Further, the meter is configured such that the central processing unit calculates the safety floating factor f of each journey, $$f = f(CDN, ACDT, LDN, ALDT)$$

$$= f_{CDN} \times f_{ACDT} \times f_{LDN} \times f_{ALDT}$$

wherein CDN represents 100-kilometer dangerous following times, ACDT represents average dangerous following duration, LDN represents 100-kilometer lane departure times, and ALDT represents average lane departure duration, $$f_{CDN} = 100 \times \frac{\sum_t T_{KD}}{2} \div \text{total journey mileage}$$

$$f_{ACDT} = \frac{2 \times \sum_t T_{KD}}{\sum_t \Delta SK_t}$$

$$f_{LDN} = 100 \times \frac{\sum_t \Delta SD_t}{2} \div \text{total journey mileage}$$

$$f_{ALDT} = \frac{2 \times \sum_t T_{DD}}{\sum_t \Delta SD_t}.$$

Further, the meter is configured such that the central processing unit calculates a journey-based mileage insurance fee P, $$P = R_{km} \times L \times f$$

wherein a mileage L is $$L = \sum_{i=1}^{n} L_{i-1,i}$$

wherein $L_{i-1,i}$ represents a distance from a trajectory point i−1 to a trajectory point i.

The machine-vision-based electronic automobile insurance fee meter disclosed by the present invention is mounted at a position of a front windshield at a central axis of an automobile, and can capture the lane departure behavior and record a distance and duration of a lane departure in the memory module; also can capture a following-too-close behavior, and record a distance and duration of dangerous following in the memory module; and also can calculate the journey-based mileage insurance fee, the total mileage insurance fee P being a product of the mileage L of the journey, a unit mileage (per kilometer) insurance rate $R_{km}$ and the safety floating factor f. According to the technical solution of the present invention, the insurance fee is charged according to an actual driving mileage, the convention of pre-payment of the automobile insurance is changed from pre-payment to post payment, the charging of the insurance fee is fairer and more reasonable, and safe driving and less driving are encouraged; and the most important dangerous driving risks including the following-too-close behavior and the lane departure also can be identified, and the pricing of the insurance fee is more accurate and reasonable.

The concept, specific structure and generated technical effects of the present invention will be further illustrated below in connection with the drawings so as to sufficiently understand the objectives, characteristics and effects of the present invention.

DETAILED DESCRIPTION OF THE PREFERRED EMBODIMENTS

Figure 1:
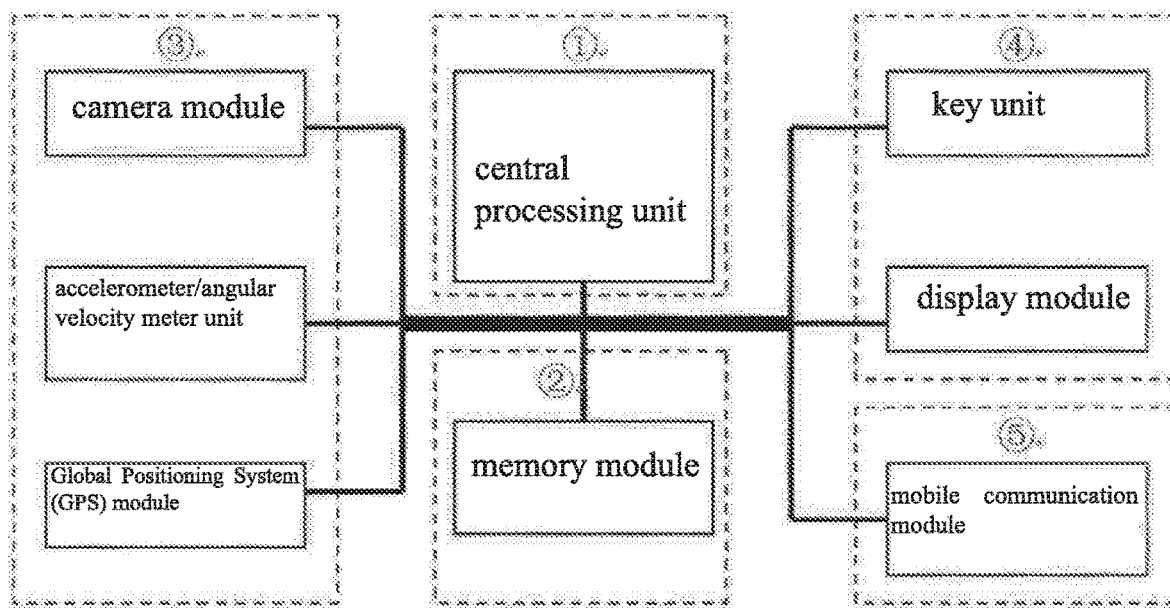
FIG. 1 is a module diagram of a machine-vision-based electronic automobile insurance fee meter according to one preferred embodiment of the present invention.

As shown in FIG. 1, according to the present invention, a machine-vision-based electronic automobile insurance fee meter includes a central processing unit, a memory module, a sensor module, a user interface module and a network communication module. The sensor module includes: a camera module, an accelerometer/angular velocity meter unit and a GPS module, wherein the camera module consists of a camera unit and an image processing chip. The meter is configured to acquire image information of the front of an insured car by the camera unit. The image processing chip performs identification on features of the image information. The central processing unit makes a determination on the identified features, and store times information and time information which accord with lane departure and following-too-close behaviors in the memory module.

Figure 2:
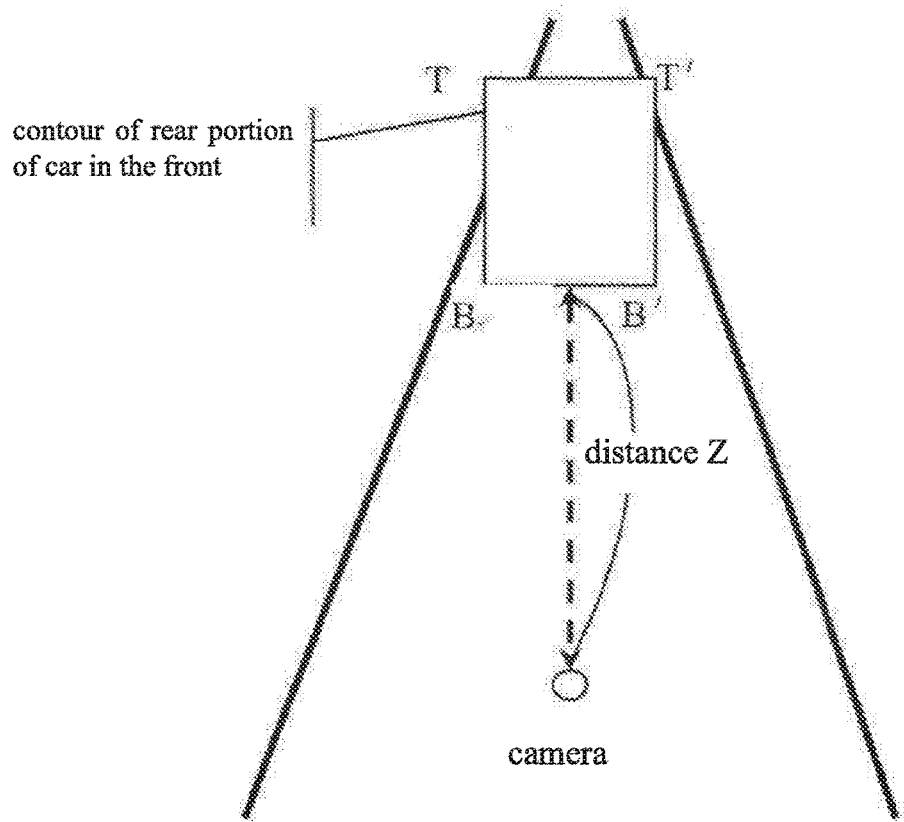
FIG. 2 is a schematic diagram of a central processing unit determining a following-too-close behavior according to one preferred embodiment of the present invention.

An example is provided below. The machine-vision-based electronic automobile insurance fee meter is mounted at a position of a front windshield at a central axis of an automobile. As shown in FIG. 2, a car width of the car is 1.8 meters, and a far-end line distance Z2 of a trapezoid of a reference lane is set as 10 meters, a near-end line distance Z1 of the trapezoid of the reference lane is set as 5 meters, an image resolution HR of a camera is set as 450 pixel/mm, and a focal length is set as 2.8 mm.

The meter captures a contour of a rear portion of a car in the front, image lengths of TT' and B' B are 102 pixel, image lengths of TB and T'B' are 144 pixel, a height-width ratio $R_l$ is equal to 1.41, and an upper-lower ratio $R_b$ is equal to 1.0. A car contour feature table is queried, so that the car in the front can be determined as a passenger car and the car width $b_F$ is 2.5 meters.

| Car Model | Height-Width Ratio $R_i$ | Upper-Lower Ratio $R_b$ | Car Width $b_F$ (meter) |
|---|---|---|---|
| Sports Car | 0.5-0.7 | <0.98 | 2.0 |
| Sedan | 0.7-0.8 | | 1.8 |
| SUV/MPV | 0.8-0.95 | | 1.9 |
| Truck | 0.95-1.4 | ≥0.98 | 2.5 |
| Passenger Car | 1.4-1.7 | | 2.5 |

A car distance Z is calculated, $$Z = \frac{b_F \times f}{BB'/HR} = \frac{2.5*2.8}{102/450} = 27.57 \text{(meter)}.$$

When a current car velocity of the car is 60 km/s and dangerous following duration is set as 2.5 s, then a following state $SK_t=1$(too close) because $Z=27.57<V_t \times T=41.67$.

Figure 3:
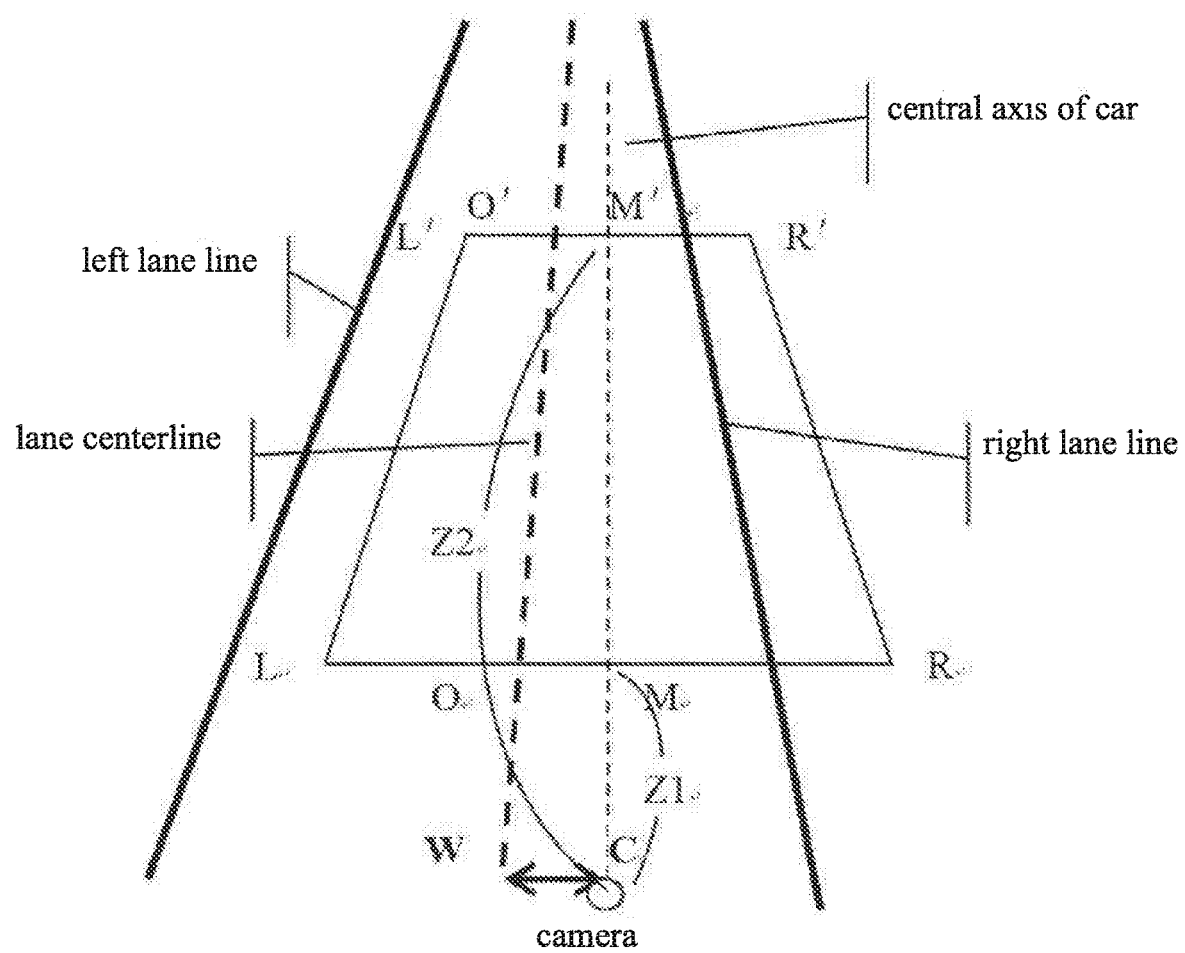
FIG. 3 is a schematic diagram of a central processing unit determining a lane departure according to one preferred embodiment of the present invention.

As shown in FIG. 3, through image identification, a width of the reference lane LR is 750 pixel, a near-end central axis OM is shifted by 240 pixel, a far-end central axis O' M' is shifted by 110 pixel.

A far-end transverse departure distance d2 is $$d2 = \frac{O'M'/HR}{f} \times Z2 = 10 * \frac{110/450}{2.8} = 0.873 \text{(meter)}.$$

A near-end transverse departure distance d1 is $$d1 = \frac{OM/HR}{f} \times Z1 = 5 \times \frac{240/450}{2.8} = 0.952 \text{(meter)}.$$

A lane line width is $$w = \frac{LR}{OM} = 2.98 \text{(meter)}.$$

An automobile axle center transverse departure distance d is $$d = (d1-d2) \times \frac{Z1}{Z2-Z1} + d1 = 1.03 \text{ (meter)}.$$

A distance of departure dp of the car from the lane line is $$dp = d + \frac{b}{2} - \frac{w}{2} = 1.03 + 0.9 - 1.49 = 0.44 \text{ (meter)}.$$

A land hold state is determined as lane hold state $SD_t=1$(right departure), because $dp>0$.

An insurance fee calculation example is provided. A total mileage of a current journey the car is 22.8 kilometers, and a per kilometer insurance rate $R_{km}$ is set as 0.5 yuan. In the journey, dangerous following times of a driver are 2 times, and average dangerous following duration is 12.5 s; and lane departure times are 12 times, and average lane departure duration is 3.2 s.

Specific following and lane departure indexes of the journey are as follows:

CDN=8.8
ACDT=12.5
LDN=52.6
ALDT=3.2

The following factor tables are queried.

| CDN 100-kilometer Following-too-close Times (times) | $f_{CDN}$ Factor |
|---|---|
| 0 | 0.25 |
| 1-2 | 0.3 |
| 3-5 | 0.56 |
| 6-15 | 0.75 |
| 16-36 | 1 |
| 37-64 | 1.38 |
| >64 | 1.8 |

| ACDT Average Following-too-close Duration (s) | $f_{ACDT}$ Factor |
|---|---|
| 0 | 0.4 |
| (0, 2) | 0.6 |
| [2, 4) | 0.85 |
| [4, 10) | 1 |
| [10, 30) | 1.15 |
| [30, 60) | 1.4 |
| [60, +∞) | 2 |

| LDN 100-kilometer Lane Departure Times (times) | $f_{LDN}$ Factor |
|---|---|
| 0 | 0.4 |
| 1-10 | 0.6 |
| 11-20 | 0.85 |
| 30-60 | 1 |
| 60-100 | 1.15 |
| 100-160 | 1.4 |
| >160 | 2 |

| ALDT Average Lane Departure Duration (s) | $f_{ALDT}$ Factor |
|---|---|
| 0 | 0.7 |
| (0, 2) | 0.85 |
| [2, 4) | 1 |
| [4, 10) | 1.15 |
| [10, 30) | 1.4 |
| [30, 60) | 1.8 |
| [60, +∞) | 2.5 |

A safety floating factor f of a driving behavior of the journey is $$f = f(8.8, 12.5, 52.6, 3.2)$$
$$= 0.75 \times 1.15 \times 1 \times 1 = 0.8625.$$

The total mileage insurance fee P of the journey is $$P = R_{km} \times L \times f = 0.5 \times 22.8 * 0.8625 = 9.8323 \text{(yuan)}.$$

The preferred specific embodiments of the present invention are described above in detail. It should be understood that those skilled in the art could make various modifications and changes according to the concept of the present invention without inventive skills. Therefore, any technical solution that can be obtained by a person skilled in the art by logic analysis, reasoning or limited experiments according to the concept of the present invention and on the basis of the prior art shall fall within the protective scope determined by the appended claims.

The invention claimed is:

1. A machine-vision-based electronic automobile insurance fee meter, comprising: a central processing unit, a memory module, a sensor module, a user interface module and a network communication module, the sensor module including: a camera module, an accelerometer/angular velocity meter unit and a GPS module, wherein the camera module consists of a camera unit and an image processing chip; and the meter is configured to acquire image information of the front of an insured car by the camera unit, the image processing chip processes and identifies features of the image information, the central processing unit makes a determination on the identified features, and stores times information and time information which accord with lane departure and following-too-close behaviors in the memory module;

wherein the meter is configured such that the central processing unit calculates the safety floating factor f of each journey, $$f = f(CDN, ACDT, LDN, ALDT)$$
$$= f_{CDN} \times f_{ACDT} \times f_{LDN} \times f_{ALDT},$$

wherein CDN represents 100-kilometer dangerous following times, ACDT represents average dangerous following duration, LDN represents 100-kilometer lane departure times, ALDT represents average lane departure duration, $$f_{CDN} = 100 \times \frac{\sum_t T_{KD}}{2} \div \text{total journey mileage}$$

$$f_{ACDT} = \frac{2 \times \sum_t T_{KD}}{\sum_t \Delta SK_t}$$

$$f_{LDN} = 100 \times \frac{\sum_t \Delta SD_t}{2} \div \text{total journey mileage}$$

$$f_{ALDT} = \frac{2 \times \sum_t T_{DD}}{\sum_t \Delta SD_t}.$$

2. The machine-vision-based electronic automobile insurance fee meter according to claim 1, characterized in that the accelerometer/angular velocity meter unit acquires an acceleration and an angular velocity of the insured car; and the GPS module acquires data of GPS, GLONASS or Beidou system real-time trajectory of the insured car.

3. The machine-vision-based electronic automobile insurance fee meter according to claim 1, characterized in that the user interface module includes: a display module and a key unit; the user interface module is configured such that a user can select and query a kilometer insurance fee unit price, a charged mileage, an insurance fee of the charged mileage, an insurance fee floating factor and lane departure and following-too-close records by operating the key unit; and query results are displayed on the display module.

4. The machine-vision-based electronic automobile insurance fee meter according to claim 1, characterized in that the network communication module is configured to support 4G/3G/2G network systems, and is used for carrying out information interaction with a car insurance business database of an insurance company and generating an insurance fee transaction record.

5. The machine-vision-based electronic automobile insurance fee meter according to claim 1, characterized in that the meter is configured such that gray scale filtering processing is performed on the image information by the image processing chip; the central processing unit detects out a quadrilateral contour TT' B' B of a rear portion of a car in the front according to bilateral symmetrical and horizontal-vertical boundary features of the car in the front, and obtains coordinates of four vertexes of the contour in an image, then calculates a contour feature ratio, an upper-lower bottom ratio $R_b$ and a height-width ratio $R_l$, $$R_b = \frac{TT'}{BB'}, \quad R_l = \frac{TB}{BB'},$$

and a car feature table is queried according to values of $R_b$ and $R_l$ so as to obtain a type and a width $b_F$ of the car in the front; and finally, according to a focus length and an image resolution of the camera module, an actual distance Z from the car in the front is calculated, $$Z = \frac{b_F \times f}{BB'/HR},$$

wherein $b_F$ represents a car width of the car in the front, f represents a lens focus length of a camera, BB' represents a pixel width in the image of the car in the front, and HR represents a horizontal resolution of the camera unit; and if a current actual car velocity is Vt, and according to set minimum safe following reaction time $T_s$, when $Z<V_t \times T_s$, a dangerous following behavior is determined.

6. The machine-vision-based electronic automobile insurance fee meter according to claim 5, characterized in that the meter is further configured such that the central processing unit calculates following-too-close duration $T_{KD}$, $$T_{KD} \int SK_t * dt,$$

wherein $SK_t$ represents a following safety state, $$SK_t = \begin{cases} 1 \text{ (too close)} & \text{when } Z < V_t \times T_s \\ 0 \text{ (safe)} & \text{when } Z \geq V_t * T_s \end{cases},$$

and when the following-too-close duration $T_{KD}$ is greater than a preset value, the dangerous following behavior is determined.

7. The machine-vision-based electronic automobile insurance fee meter according to claim 1, characterized in that the meter is configured such that gray scale filtering processing is performed on the image information by the image processing chip; and the central processing unit identifies a laneway line sign in a current road and coordinates of the laneway line sign in the image according to edge features of an oblique straight line of the laneway line sign, calculates coordinates of a lane centerline OO', and meanwhile, also calculates a coordinate distance LR of left and right laneway lines and a lane width w, compares coordinate differences between the lane centerline OO' in the image and a central axis MM' of front and rear wheels of the car, i.e., OM and O'M', and calculates to obtain corresponding far-end and near-end central axis departures d2 and d1 through an optical perspective geometric imaging formula, $$d2 = \frac{O'M'/HR}{f} \times Z2,$$

wherein O'M' represents a far-end image coordinate pixel distance value, Z2 represents a distance from a far-end line to the camera, HR represents an image resolution of the camera and f represents a focal length of the camera;

$$d1 = \frac{OM/HR}{f} \times Z1,$$

wherein OM represents a near-end image coordinate pixel distance, Z1 represents a distance from a near-end line to the camera, HR represents the image resolution of the camera, and f represents the focal length of the camera; then according to the distances Z2 and Z1 from the far-end and near-end lines to the camera, on the basis of a geometric proportion relationship, a transverse position d of an axle center C of the front wheels of the car in a lane is calculated;

$$d = (d1 - d2) \times \frac{Z1}{Z2 - Z1} + d1$$

and finally, according to the lane width w and a car width b, an actual distance of departure dp of the car from the lane line can be calculated, $$dp = \begin{cases} d + \frac{b}{2} - \frac{w}{2}, & \text{when } d > \frac{w-b}{2} \\ d - \frac{b}{2} + \frac{w}{2}, & \text{when } d < \frac{b-w}{2} \\ 0, & \text{when } \frac{b-w}{2} \leq d \leq \frac{w-b}{2} \end{cases},$$

wherein the lane width w is $$w = \frac{LR}{OM},$$

and when the lane departure distance dp is greater than a preset value, a lane departure behavior is determined.

8. The machine-vision-based electronic automobile insurance fee meter according to claim 7, characterized in that the meter is further configured such that the central processing unit calculates the lane departure duration $T_{DD}$, $$T_{DD} \int |SD_t * dt|$$

wherein a land hold state $SD_t$ is $$SD_t = \begin{cases} 1 \text{ (right departure)} & \text{when } dp > 0 \\ 0 \text{ (safe)} & \text{when } dp = 0 \\ -1 \text{ (left departure)} & \text{when } dp < 0 \end{cases}$$

and when the land hold state $SD_t$ is greater than a preset value, the lane departure behavior is determined.

9. The machine-vision-based electronic automobile insurance fee meter according to claim 1, characterized in that the meter is configured such that the central processing unit calculates a journey-based mileage insurance fee, $$P = R_{km} \times L \times f$$

wherein a mileage L is $$L = \sum_{i=1}^{n} L_{i-1,i}$$

wherein $L_{i-1,i}$ represents a distance from a trajectory point i−1 to a trajectory point i.

* * * * *